United States Patent
Kodimer et al.

(10) Patent No.: US 9,015,582 B2
(45) Date of Patent: Apr. 21, 2015

(54) USER INTERFACE FOR REORDERING THUMBNAILS

(75) Inventors: Marianne Kodimer, Huntington Beach, CA (US); Reza Ghassemi, Orange, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 354 days.

(21) Appl. No.: 13/461,633

(22) Filed: May 1, 2012

(65) Prior Publication Data

US 2013/0298014 A1    Nov. 7, 2013

(51) Int. Cl.
| | |
|---|---|
| G06F 17/00 | (2006.01) |
| H04N 1/00 | (2006.01) |
| G06F 3/0483 | (2013.01) |
| G06F 3/0488 | (2013.01) |
| G06F 17/21 | (2006.01) |

(52) U.S. Cl.
CPC .......... *H04N 1/00411* (2013.01); *G06F 3/0483* (2013.01); *G06F 3/04883* (2013.01); *G06F 17/212* (2013.01); *H04N 1/00448* (2013.01); *H04N 2201/0094* (2013.01)

(58) Field of Classification Search
CPC .............................. G06F 3/0486; G06F 3/0481
USPC .................................................. 715/251, 243
See application file for complete search history.

(56) References Cited

U.S. PATENT DOCUMENTS

| | | | |
|---|---|---|---|
| 8,286,098 B2 * | 10/2012 | Ju et al. ........................ | 715/849 |
| 8,407,622 B2 * | 3/2013 | Rhee et al. .................... | 715/840 |
| 8,539,376 B2 * | 9/2013 | Utsuki et al. .................. | 715/835 |
| 8,549,429 B2 * | 10/2013 | Tsuruta et al. ................ | 715/810 |
| 8,760,448 B2 * | 6/2014 | Lee et al. ...................... | 345/419 |
| 8,892,168 B2 * | 11/2014 | Yang ............................. | 455/566 |
| 2001/0024212 A1 * | 9/2001 | Ohnishi ........................ | 345/769 |
| 2004/0012506 A1 * | 1/2004 | Fujiwara et al. ............. | 340/995.1 |
| 2004/0193571 A1 * | 9/2004 | Barrus et al. .................. | 707/1 |
| 2005/0091596 A1 * | 4/2005 | Anthony et al. .............. | 715/712 |
| 2006/0253797 A1 * | 11/2006 | Madan et al. ................. | 715/792 |
| 2008/0104535 A1 * | 5/2008 | DeLine et al. ................ | 715/785 |
| 2011/0035691 A1 * | 2/2011 | Kim .............................. | 715/765 |
| 2011/0145733 A1 * | 6/2011 | Neitz et al. ................... | 715/761 |
| 2011/0145758 A1 * | 6/2011 | Rosales et al. ............... | 715/794 |
| 2011/0179364 A1 * | 7/2011 | Morris .......................... | 715/764 |

(Continued)

OTHER PUBLICATIONS

How to Reorder slides in XekSlides, Dec 23, 2010, pp. 1-4 https://www.youtube.com/watch?v=yfXr9gKxxrQ.*

(Continued)

*Primary Examiner* — Kyle Stork
*Assistant Examiner* — Mario M Velez-Lopez
(74) *Attorney, Agent, or Firm* — SoCal IP Law Group LLP; Steve C. Sereboff; Jonathan Pearce (57) ABSTRACT

There is disclosed a method and apparatus for reordering thumbnails. The method includes displaying a visual representation of an electronic document including a first page and a second page in an original order on a user interface generated on a touchscreen display, receiving movement data indicating that the touch has moved in a horizontal direction relative to the user interface, toward the second page. The method also includes altering the visual representation in response to release data such that the first page and the second page are presented in an altered order in the electronic document.

15 Claims, 10 Drawing Sheets

(56) References Cited

U.S. PATENT DOCUMENTS

| | | | |
|---|---|---|---|
| 2011/0252375 A1* | 10/2011 | Chaudhri | 715/835 |
| 2012/0030569 A1* | 2/2012 | Migos et al. | 715/702 |
| 2012/0081359 A1* | 4/2012 | Lee et al. | 345/419 |
| 2012/0198384 A1* | 8/2012 | Kumamoto | 715/786 |
| 2013/0159940 A1* | 6/2013 | Duffy et al. | 715/863 |
| 2014/0101587 A1* | 4/2014 | Sekine | 715/769 |

OTHER PUBLICATIONS

Guide for beginners and administrators, "Adminxp", Apr 21, 2007, pp. 1-4 http://adminxp.com/windowsxp/index.php?aid=183.*

How to Reorder slides in XekSlides, Dec. 23, 2010, pp. 1-4 https://www.youtube.com/watch?v=yfXr9g KxxrQ.*

Guide for beginners and administrators, "Adminxp", Apr. 21, 2007, pp. 1-4 http://adminxp.com/windowsxp/index.php?aid= 183.*

* cited by examiner

USER INTERFACE FOR REORDERING THUMBNAILS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to a user interface for reordering thumbnails.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as a document, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

User interfaces are used in every user to computer interaction. One type of user interaction is used to reorder thumbnails. On computers, the process of reordering thumbnails typically involves utilizing a mouse to highlight or select a thumbnail image or page by clicking, then maintaining the downclick and moving the mouse to the location desired for the thumbnail. On capacitive touchscreen devices, such as the Apple® iPhone® and many other mobile devices, the process may be very similar. The user may touch a screen over a thumbnail to be moved, then move the thumbnail to the desired location. Selection of a thumbnail in both situations may be shown, for example, by altering the coloration of the thumbnail and showing movement when the mouse or touch is moved.

A similar interaction is more difficult in non-capacitive touchscreen and non-mouse-based user interfaces. These interfaces typical show selection of a thumbnail by highlighting the thumbnail in a color. In some cases, numerals are assigned to the thumbnails, the numerals indicating the pre-movement order of the thumbnails. It is difficult to determine where in the series of thumbnails a particular thumbnail was originally located or where in the series of thumbnails a selected thumbnail is currently located. After a user has moved a thumbnail, it is also difficult to determine where the movement began or to reset the thumbnails to a default state.

Throughout this description, elements appearing in figures are assigned three-digit reference designators, where the most significant digit is the figure number and the two least significant digits are specific to the element.

DETAILED DESCRIPTION

Description of Apparatus

Figure 1:
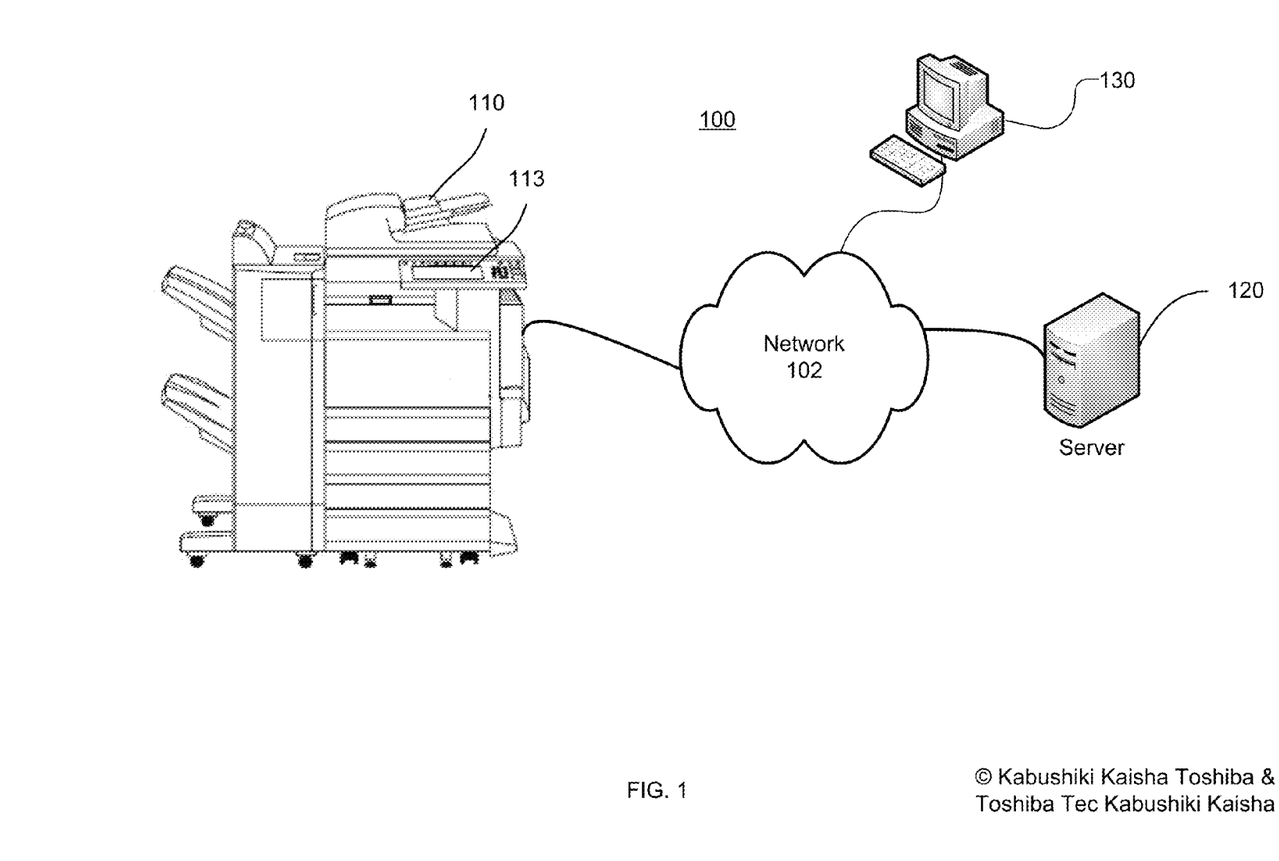
FIG. 1 is a diagram of an MFP system.

Referring now to FIG. 1 there is shown an MFP system 100. The system 100 includes an MFP 110, a server 120, and a client computer 130, all interconnected by a network 102. The system 100 may be implemented in a distributed computing environment and interconnected by the network 102.

The network 102 may be a local area network, a wide area network, a personal area network, the Internet, an intranet, or any combination of these. The network 102 may have physical layers and transport layers according to IEEE 802.11, Ethernet or other wireless or wire-based communication standards and protocols such as WIMAX®, BLUETOOTH®, the public switched telephone network, a proprietary communications network, infrared, and optical.

The MFP 110 may be equipped to receive portable storage media such as USB drives. The MFP 110 includes a user interface subsystem 113 which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alphanumeric keypad and/or an associated thin client through which a user may interact directly with the MFP 110.

The server 120 is a server computer running software and connected to the network. The client computer 130 may be a PC, thin client or other device. The client computer 130 is representative of one or more end-user devices.

Figure 2:
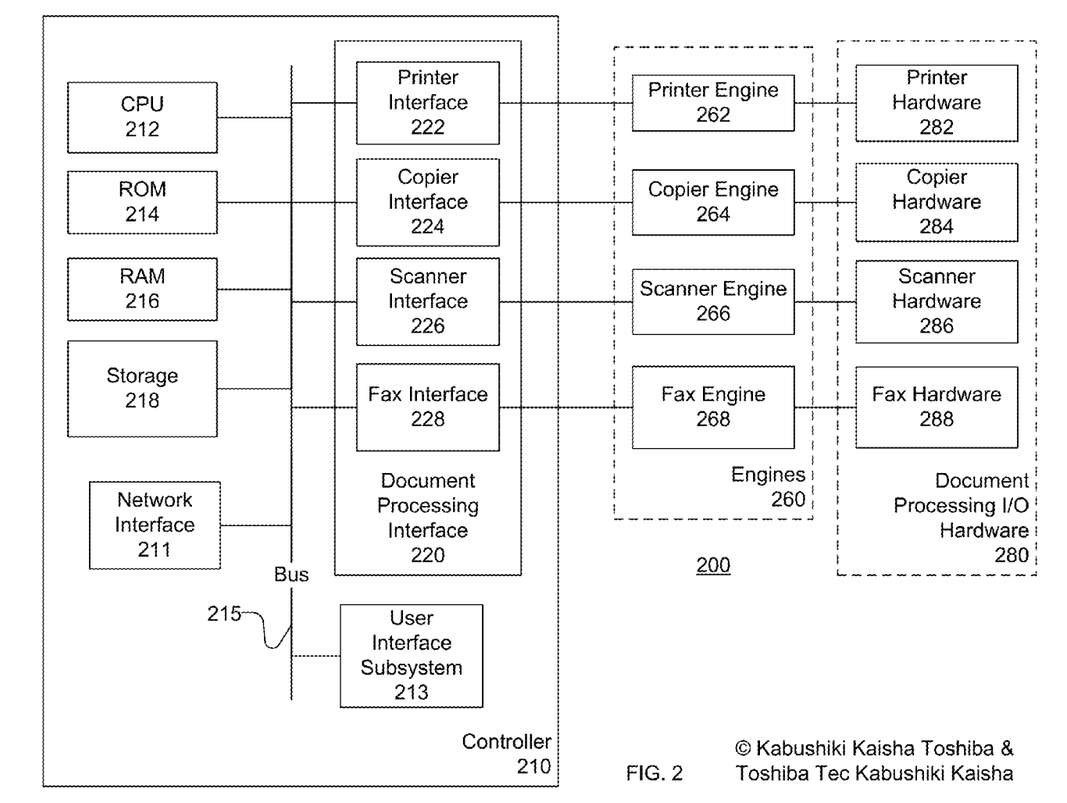
FIG. 2 is a block diagram of an MFP.

Turning now to FIG. 2 there is shown a block diagram of an MFP 200 which may be the MFP 110. The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state storage. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 allowing the MFP 200 to communicate with other devices.

The bus 215 enables data communication between devices and systems within the MFP 200. The bus 215 may conform to the, PCI, PCI Express, or another bus standard.

The MFP 200 may operate substantially autonomously. However, the MFP 200 may be controlled from and provide output to the user interface subsystem 213, which may be the user interface subsystem 113.

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may include software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions. These engines may include software, firmware, hardware or a combination thereof that enable the document processing interface 220 to communicate with the document processing I/O hardware 280.

Figure 3:
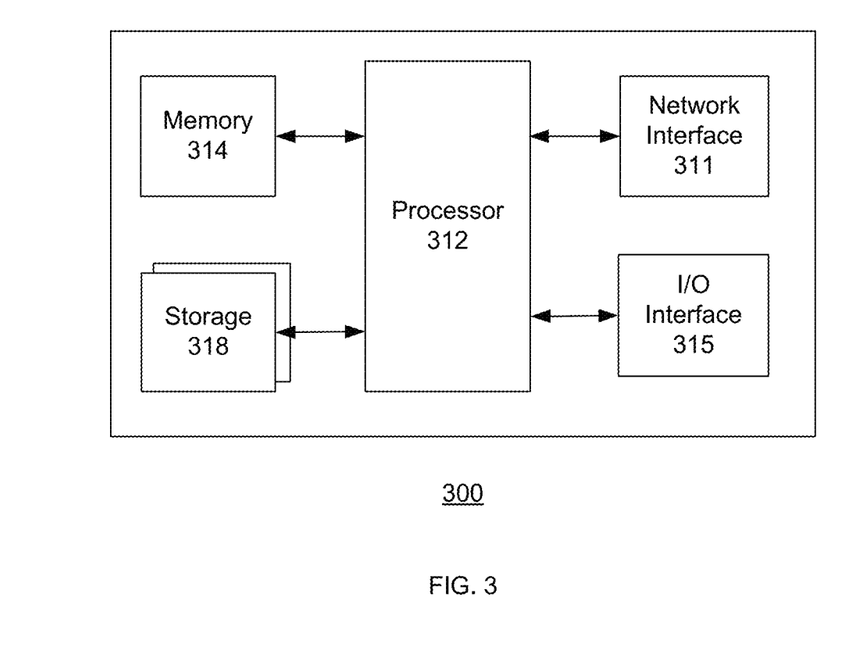
FIG. 3 is a block diagram of a computing device.

Turning now to FIG. 3 there is shown a computing device 300, which is representative of the server computers, client computers and other computing devices discussed herein. The controller 210 may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, field programmable gate arrays (FPGAs), application specific integrated circuits (ASICs), programmable logic devices (PLDs) and programmable logic arrays (PLAs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

As used herein, the term storage medium corresponds to the storage 318 and does not include transitory media such as signals or waveforms.

The network interface 311 includes an interface to a network such as network 102.

The I/O interface 315 interfaces the processor 312 to peripherals (not shown) such as displays, keyboards and USB devices.

Figure 4:
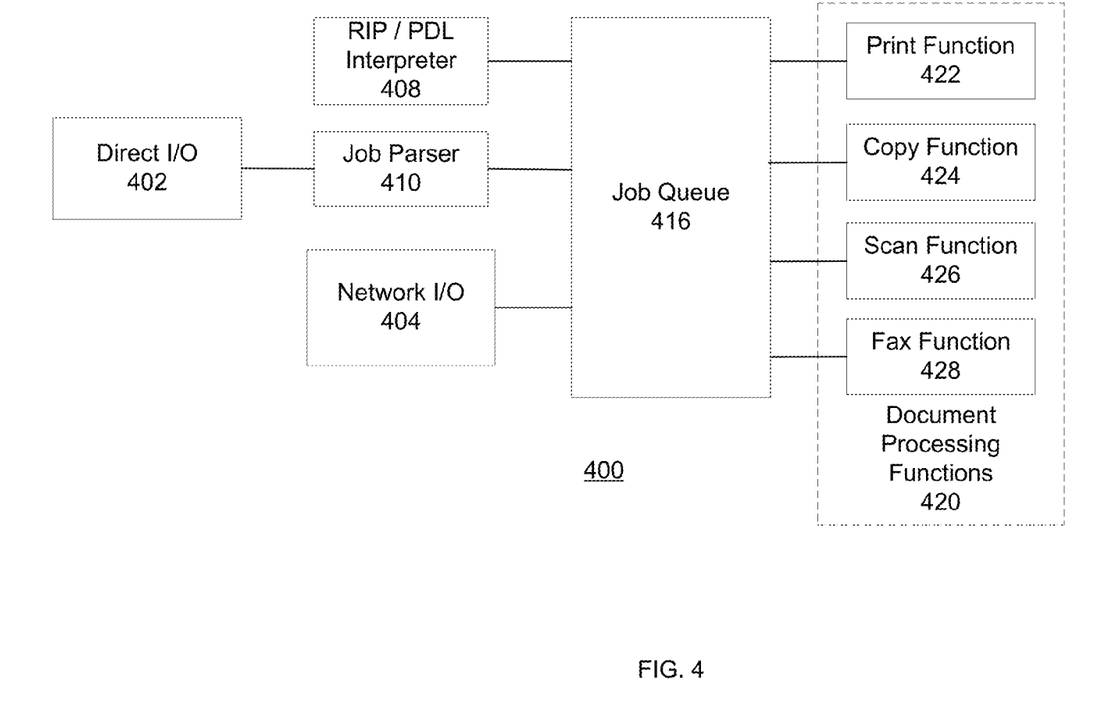
FIG. 4 is a block diagram of a software system for an MFP.

Turning now to FIG. 4 there is shown a block diagram of a software system 400 of an MFP which may operate on the controller 210. The system 400 includes direct I/O 402, network I/O 404, a RIP/PDL interpreter 408, a job parser 410, a job queue 416, a series of document processing functions 420 including a print function 422, a copy function 424, a scan function 426 and a fax function 428.

The direct I/O 402 and the network I/O 404 provide input and output to the MFP controller. The direct I/O 402 is for the user interface on the MFP (e.g., user interface subsystem 113), and the network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail, TELNET, or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the direct I/O 402. The direct I/O 402 may include printing, fax transmission or other input of a document for handling by the system 400.

The print function 422 enables the MFP to print documents and implements each of the various functions related to that process using the printer interface 222. These include stapling, collating, hole punching, and similar functions. The copy function 424 enables the MFP to perform copy operations and all related functions such as multiple copies, collating, 2 to 1 page copying or 1 to 2 page copying and similar functions using the copier interface 224. Similarly, the scan function 426 enables the MFP to scan and to perform all related functions such as shrinking scanned documents, storing the documents on a network or emailing those documents to an email address using the scanner interface 226. The fax function 428 enables the MFP to perform facsimile operations and all related functions such as multiple number fax or auto-redial or network-enabled facsimile using the fax interface 228.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Figure 5:
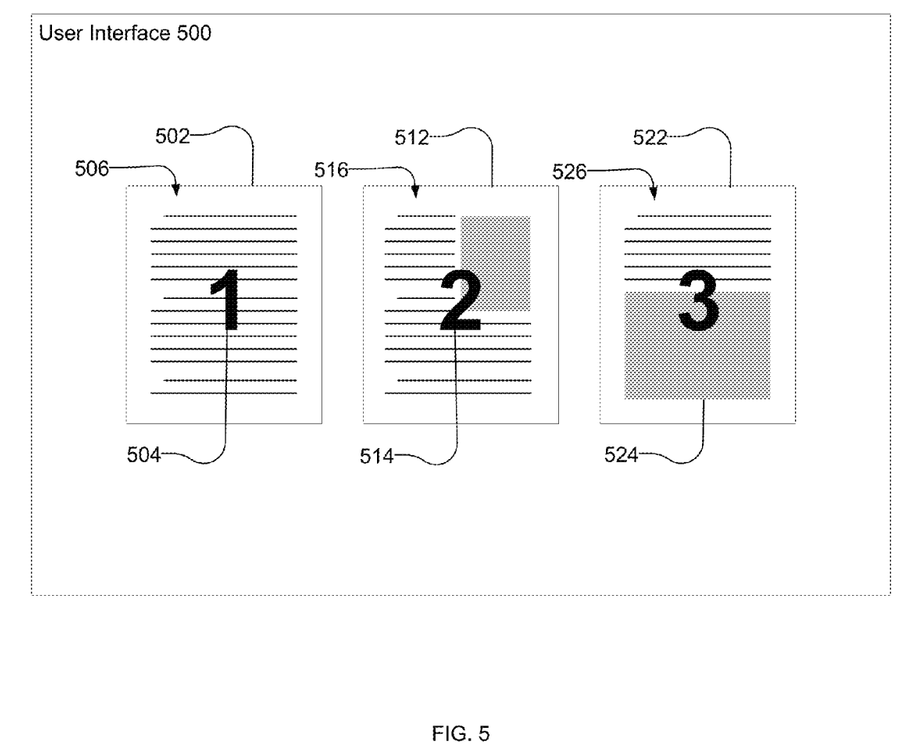
FIG. 5 is a user interface for thumbnail reordering.

Turning now to FIG. 5 there is shown a user interface 500 for thumbnail reordering. The user interface 500 may be presented on the user interface subsystem 213 under the direction of the controller 210. The user interface 500 includes first, second and third thumbnail pages 502, 512 and 522. The phrases "thumbnail page," "page," "thumbnail," "image" are each intended to describe a small representation of a single page of a multi-page electronic document presented on a screen in a small, preview form. The terms are intended to be interchangeable one with another.

The first thumbnail page 502 includes a ordinal number 504 and a visual element 506. The second thumbnail page 512 includes an ordinal number 514 and a visual element 516. The third thumbnail page 522 includes an ordinal number 524 and a visual element 526.

The ordinal numbers 504, 514, 524 indicate the current ordering of the thumbnail pages on the user interface 500. That is, ordinal numbers 504, 514 and 524 show the current numbering of the thumbnail images on the screen. If the ordering is changed, the ordinal numbers 504, 514 and 524 are updated as the ordering changes such that a user will be able to determine the current placement of the thumbnail page being reordered.

Visual element 506, visual element 516 and visual element 526 are smaller scale representations of the visual data shown on the thumbnail. For example, in a document made up of text only, the visual element 506 will show a smaller version of that text, such that each of visual element 506, visual element 516 and visual element 526 have differing appearances and may be visually differentiated from one another by a user viewing the thumbnail images.

Figure 6:
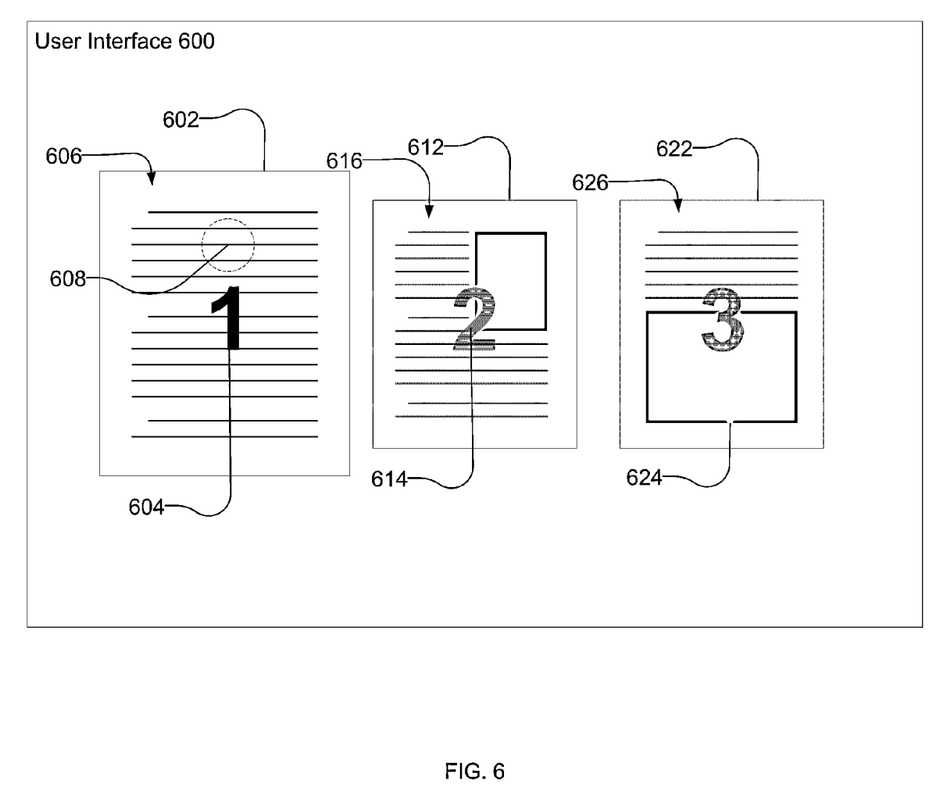
FIG. 6 is a user interface for thumbnail reordering showing a selected first page.

Turning now to FIG. 6 a user interface for thumbnail reordering showing a selected first thumbnail is shown. The same first, second and third thumbnail pages 602, 612 and 622 from FIG. 5 are shown. The same ordinal numbers 604, 614 and 624 and visuals one 606, two 616 and three 626 from FIG. 5 are also shown.

In addition, a touch 608 is represented by a circular region on the first thumbnail page 602. In response to the touch and a hold of the touch for a predetermined period of time, for example 0.5 seconds, the first thumbnail page 602 has been selected. As a result of the selection, the first thumbnail page 602 has grown in size, relative to the second and third thumbnail pages 612 and 622. When the first thumbnail page 602 is in the selected state, the transparency of the second and third thumbnail pages 612 and 622 is increased, relative to the first thumbnail page 602. This causes those pages to appear semi-transparent or more faintly, relative to the background and the first thumbnail page 602. Similarly, the transparency of the ordinal numbers 614 and 624 is increased. As a result, the second and third thumbnail pages 612 and 622 appear to "fade out" on the display.

Also when the first thumbnail page 602 in the selected state, the z-ordering of the second and third thumbnail pages 612 and 622 are decreased relative to the first thumbnail page 602. Alternatively, the z-ordering of the first thumbnail page 602 is increased relative to the second and third thumbnail pages 612 and 622. The z-ordering is an operating system-level designation that indicates the respective priority of depth of various user interface elements. Elements with higher z-ordering than other elements appear to be "on top" of elements with lower z-ordering. Accordingly, when the first thumbnail page 602 passes over the second and third thumbnail pages 612 and 622; the first thumbnail page 602 will appear to be "over" or "above" the second and third thumbnail pages 612 and 622.

Figure 7:
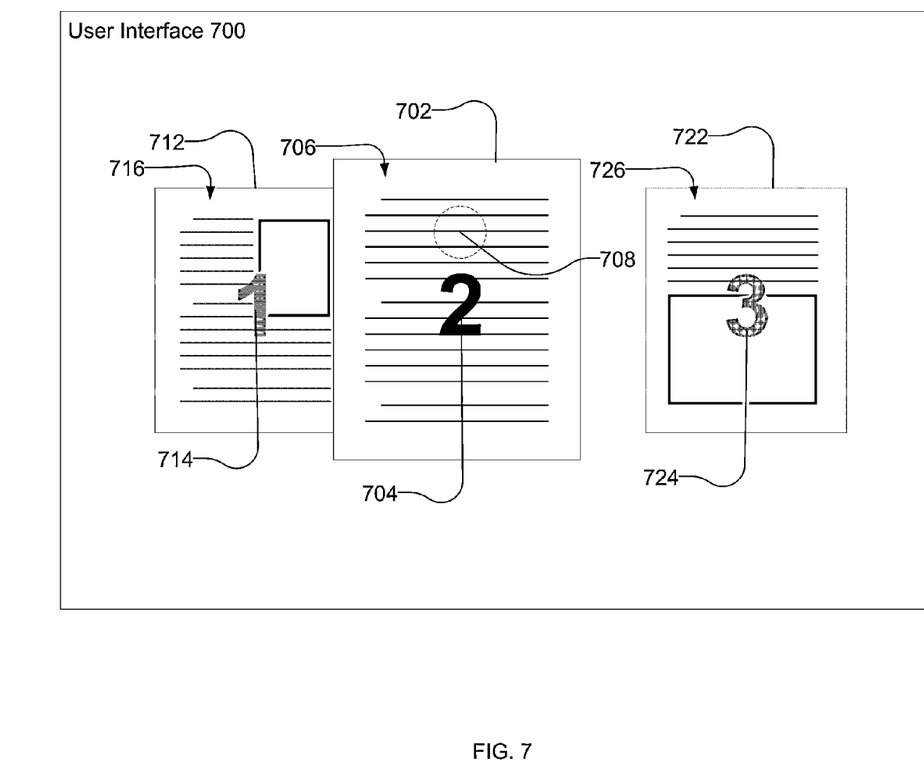
FIG. 7 is a user interface for page reordering showing a first thumbnail being moved.

FIG. 7 shows a user interface for page reordering showing a first thumbnail being moved. The user interface 700 includes the same first thumbnail page 702, second thumbnail page 712 and third thumbnail page 722. The first thumbnail page 702 includes ordinal number 704 and visual one 706. It also includes touch 708, now moved horizontally nearer to the center of the user interface 700. The first thumbnail page 702 remains larger than either the second or third thumbnail pages 712 and 722.

The second and third thumbnail pages 712 and 722 are also shown. Each includes an ordinal number 714 and 724 along with associated visual two 716 and visual three 726. The first and second thumbnail pages 712 and 722 remain partially transparent and maintain a z-ordering less than that of the first thumbnail page 702. As can be seen, the first thumbnail page 702 is overlapping the second thumbnail page 712 based upon this z-ordering.

In response to the movement of the touch 708 over the first thumbnail page 702 horizontally toward the center of the user interface 700, the first thumbnail page 702 has moved toward the center of the user interface 700. In addition, the ordinal number 704 has updated to a "2" in place of the "1" that appears, for example, in FIG. 5. Similarly, the ordinal number 714 has updated to a "1" in place of the "2" that appeared in FIG. 5, before the movement of the touch 708. In this way, the ordinal numbers 704, 714 and 724 clearly indicate the current ordering of the thumbnail pages 702, 712 and 722.

Figure 8:
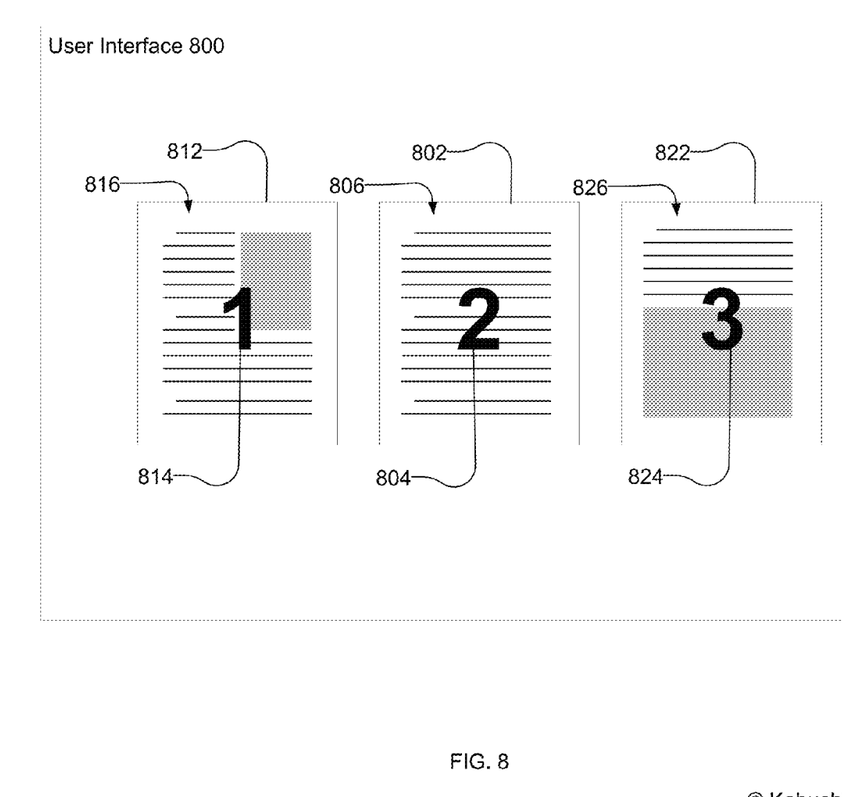
FIG. 8 is a user interface showing the completion of the thumbnail reordering.

FIG. 8 shows a user interface showing the completion of the thumbnail reordering. The first thumbnail page 802 is now between the second thumbnail page 812 and third thumbnail page 822. The visual one 806, visual two 816 and visual three 826 provide visual feedback as to which of the thumbnail pages 802, 812 and 822 are in which location. But, the ordinal numbers 804, 814 and 824 have changed to reflect the new ordering. The transparency of the second and third thumbnail pages 812 and 822 has been returned to normal to match that of the first thumbnail page 802.

Figure 9:
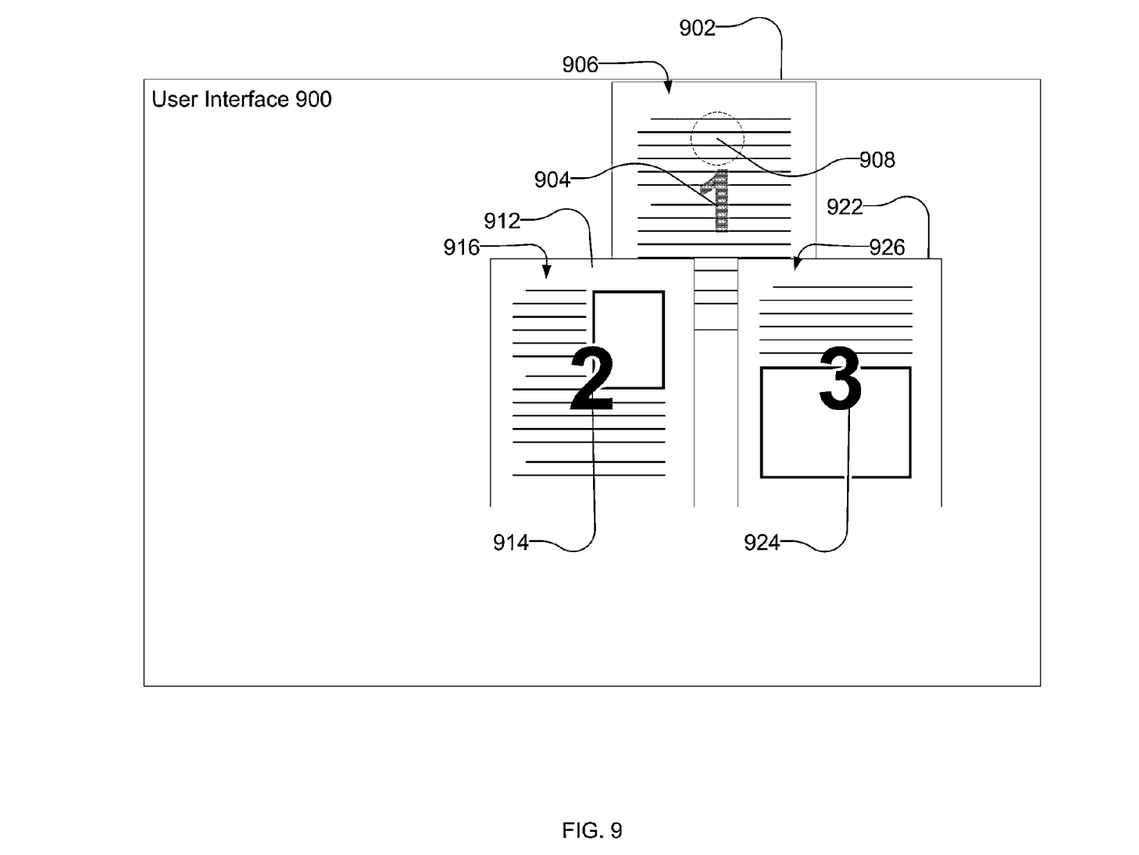
FIG. 9 is a user interface showing a decision not to reorder the thumbnails.

Turning now to FIG. 9 a user interface showing a decision not to reorder the thumbnails is shown. In this user interface 900, the same as that shown in FIGS. 5-8, but the user has moved the touch 908 vertically relative to the center of the user interface 900. As a result the thumbnail page 902 has moved upward along with the associated visual one 906 and ordinal number 904. The second and third thumbnail pages 912 and 922 have returned to their original positions shown in FIG. 5 along with ordinal numbers 914 and 924 and visual two 916 and visual three 926.

As a result of the touch 908 moving vertically to the top of the user interface 900, the transparency of the first thumbnail page 902 is reduced, relative to the second and third thumbnail pages 912 and 922. The z-ordering of the first thumbnail page 902 is also reduced relative to the second and third thumbnail pages 912 and 922 such that the first thumbnail page 902 now appears behind the second and third thumbnail pages 912 and 922. Once the touch is released, with the first thumbnail page 902 in a vertical position past a predetermined vertical threshold, for example, with an edge touching the top or bottom of the user interface 900, the first thumbnail page 902 is returned to its original position as shown in FIG. 5.

Description of Processes

Figure 10:
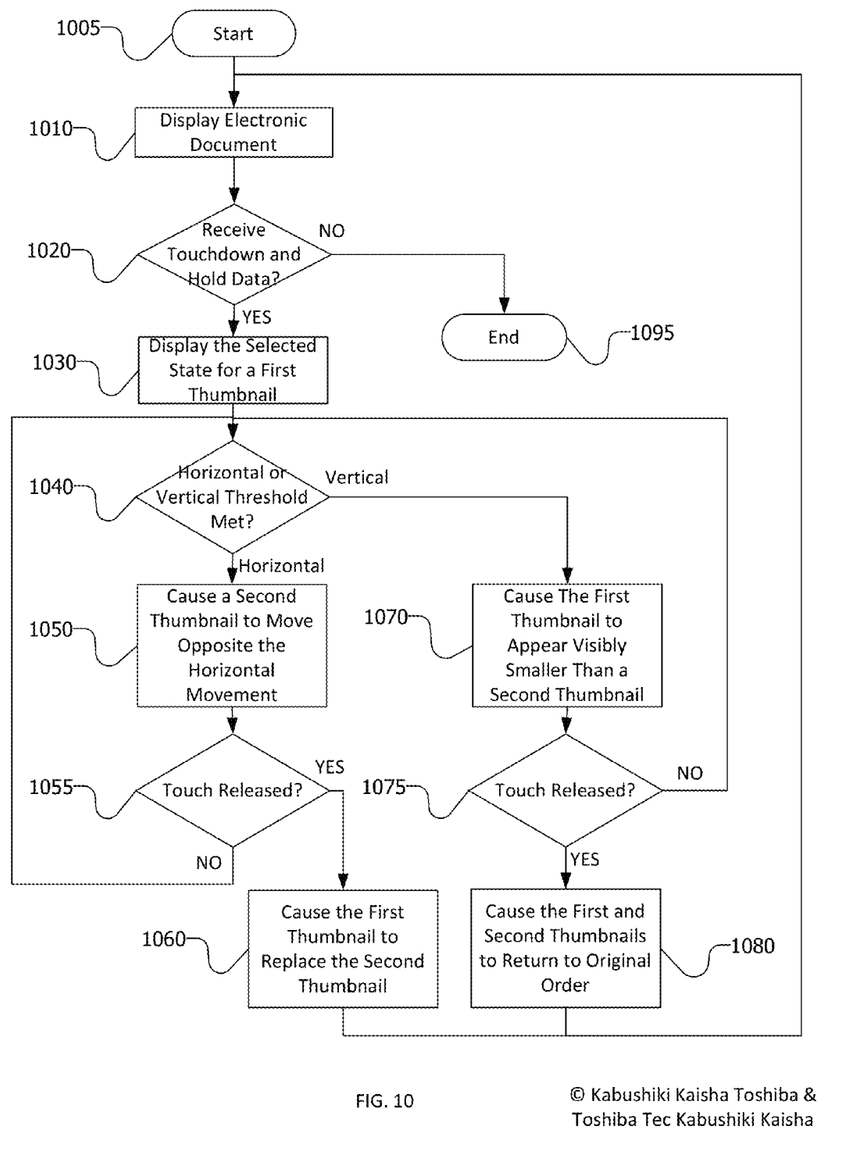
FIG. 10 is a flowchart for a user interface for thumbnail reordering.

Turning now to FIG. 10, there is shown a flowchart for a user interface for thumbnail reordering. The flowchart begins at start 1005 when a visual representation of an electronic document is displayed 1010 on the user interface, such as user interface subsystem 213. The electronic document may be any multi-page document, such as a Microsoft® Word® document, a series of digital images, an Adobe® PDF document, a Microsoft® Excel® spreadsheet, a Microsoft® PowerPoint® presentation or any similar document despite their specific file type. The term "thumbnail" is described above with reference to FIG. 5.

The electronic document appears in a form similar to that shown in FIG. 5. In particular, the ordinal numbers 504, 514 and 524 appear over the corresponding thumbnail pages 502, 512 and 522. The associated visuals one, two and three 506, 516 and 526 also appear. The displays of multifunction peripherals are typically much lower resolution than those provided by comparable computer monitors and mobile devices. Accordingly, all of this information enables a user to quickly see the current ordering of the documents and to recognize changes.

Next, the user interface subsystem 213 receives user touchdown data and hold data. The touchdown data indicates that a user has touched a touchscreen integral to the user interface subsystem 213, the touch being over a first page of the electronic document. The hold data indicates that the user has held the touch for a predetermined period of time. The hold data may indicate that the user has held the touch, for example, for one half of one second or one second. If no touchdown and hold data is received, then this process ends 1095. Other user interface subsystem 213 processes may continue or take place apart from this flow chart.

The hold data, indicating that a user has held a touch for a predetermined period of time, is needed because accurate "double-tap" interactions are difficult on pressure-based or light-interference based touchscreen displays typically used on multifunction peripherals. Capacitive touchscreens and computer mice are more capable of registering a "double-tap" or "double-click" gesture than typical touchscreen displays integrated into most multifunction peripherals, however these displays are unnecessarily expensive for inclusion in most multifunction peripherals.

Once the touchdown data and hold data are received, the visual representation of the electronic document is altered such that a selected state for the first page under the touch is shown 1030. This selected state is shown in FIG. 6. In the selected state, the first thumbnail page 602 is enlarged and has a higher z-ordering than the second and third thumbnail pages 612 and 622 shown. In addition, the transparency of the second and third thumbnail pages 612 and 622 are increased. As described above, the touchscreen displays on most multifunction peripherals are lower resolution than typical computer monitors or mobile devices. Accordingly, the change in transparency, the change in the size of the first thumbnail page and the z-ordering enable a user of that screen to clearly determine that the selected state has been initiated.

Next, a determination whether a horizontal or vertical threshold are met is made 1040. This determination utilizes movement data generated by the touchscreen and passed to the controller so that the controller may update the display. The movement data indicates a current location of a touch on the touchscreen, whether the touch is moving and in what direction. The horizontal or vertical threshold test 1040, determines whether movement of the touch vertically or horizontally exceeds a threshold. Horizontal movement indicates that a user has begun the process of reordering the thumbnails. Vertical movement indicates that a user has begun the process of aborting the reordering process in order to reset the thumbnails to their original pre-touch and hold order.

However, reordering or return to the original order does not proceed until a user has crossed a horizontal or vertical threshold. Further, reordering or return to the original order does not proceed until a user has crossed a horizontal or vertical threshold and released a touch. For example, reordering between a first and a second thumbnail may take place once the user has moved the touch of a first thumbnail across a vertical threshold of a vertical bi-section line in the middle of a second thumbnail. Alternatively, reordering may not take place until the user has crossed a vertical threshold of the opposite vertical edge (furthest from the first thumbnail) of a second thumbnail. Similarly, a vertical threshold may be moving the touch over the first thumbnail more than 80 percent of the way to the top of a user interface or may be causing the top of the first thumbnail to touch the top of a user interface.

Once a horizontal threshold is met, the visual representation of the electronic document is altered such that the second page is moved opposite the horizontal movement of the touch. In this way, the second thumbnail makes "room" for the first thumbnail in the user interface. This can be seen, for example, in FIG. 7, described above. If the touch is released 1055 thereafter, then the first thumbnail will replace the second thumbnail in the electronic document displayed on the user interface 1060. This may be seen, for example, in FIG. 8, described above.

If the touch is not released 1055, then a determination is made, again, whether a horizontal of vertical threshold is met 1040 and the process begins again. In order to determine whether a touch has been released, the touchscreen provides release data to the controller which then operates to update the display of the user interface. If further horizontal thresholds are met, the first thumbnail can cause yet another second thumbnail to move 1050 and another test for release of the touch is completed 1055. In this way, the process may repeat itself for an indefinite number of movements of the first thumbnail across a series of second thumbnails in an electronic document.

If the user initially moves the first touch to a vertical threshold 1040 or at some point in the process of horizontal movement of the first thumbnail moves the first touch vertically passed a vertical threshold 1040, then the reordering procedure may be aborted.

In response to the touch reaching the vertical threshold, the visual representation of the electronic document is altered such that the first thumbnail appears visibly smaller than the second thumbnail 1070. In addition, the z-ordering may be altered such that the first thumbnail appears behind the second thumbnail. Also, the transparency of the first thumbnail may be increased such that the first thumbnail appears semi-transparent, while the transparency of the second thumbnail may be decreased such that it returns to a normal level of transparency. This may be seen, for example, FIG. 9.

Next, the touchscreen provides release data to the controller indicating that the touch has been released 1075. If the touch has been released, the first and second thumbnails return to their original order 1080. The user may then choose whether to move the thumbnail over a horizontal or vertical threshold 1040. This enables the user to select and move a thumbnail multiple times, but still retain the ability to abort the reordering at any point. Once either touch is released at 1055 or 1075, and the associated thumbnail ordering takes place at 1060 or 1080; the process returns to the default display of the electronic document 1010.

The flowchart of FIG. 10 has both a start 1005 and an end 1095, but the process is cyclical in nature and may relate to one or more simultaneous instances of thumbnail reordering taking place in serial. The flowchart in FIG. 10 read in conjunction with the associated description may serve as an algorithm for the operation of the CPU 212 in the controller 210 used in conjunction with the user interface subsystem 213 to thereby control the operation and display of a user interface on the user interface subsystem 213 and in response to user interaction.

Closing Comments

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for providing a user interface comprising:
    displaying a visual representation of an electronic document including a first page and a second page in an original order on a user interface generated on a touchscreen display;
    receiving touchdown data indicating that a touch has been received from a user on the touchscreen display over the first page and hold data indicating that the user has held the touch for a predetermined period of time over the first page;
    altering the visual representation in response to the touchdown data and the hold data such that the first page is visibly larger on the user interface than the second page and such that transparency of the second page is increased relative to the first page;
    receiving movement data indicating that the touch has moved in a vertical direction relative to the user interface;
    altering the visual representation in response to the movement data, as the touch reaches a vertical threshold relative to the user interface, such that the first page is visibly smaller on the user interface than the second page and such that transparency of the first page is increased relative to that of the second page;
    receiving release data indicating that the user has released the touch; and
    altering the visual representation in response to the release data such that the first page and second page return to similar transparency and size in the original order of the first page and the second page in the electronic document.

2. The method of claim 1 wherein the first page and the second page include superimposed visual indicia of the original order on the user interface.

3. The method of claim 2 further comprising altering the visual representation such that the superimposed visual indicia are updated when the touch passes over a horizontal threshold to reflect an altered order.

4. The method of claim 1 further comprising the following, preceding the receiving movement data indicating that the touch has moved in a vertical direction relative to the user interface:
receiving movement data indicating that the touch has moved in a horizontal direction relative to the user interface, toward the second page; and
altering the visual representation of the second page in response to the movement data such that, as the touch passes over a horizontal threshold relative to the second page, the second page visibly moves in a direction opposite from the horizontal direction.

5. The method of claim 1 further comprising altering the visual representation in response to the touchdown data and hold data such that a z-ordering of the first page is increased relative to the second page such that the first page appears in front of the second page when the first page and second page overlap on the user interface.

6. A multifunction peripheral, including a processor and associated memory, the multifunction peripheral including software that when executed by the processor causes the multifunction peripheral to:
display a visual representation of an electronic document including a first page and a second page in an original order on a user interface generated on a touchscreen display;
receive touchdown data indicating that a touch has been received from a user on the touchscreen display over the first page and hold data indicating that the user has held the touch for a predetermined period of time over the first page;
alter the visual representation in response to the touchdown data and the hold data such that the first page is visibly larger on the user interface than the second page and such that transparency of the second page is increased relative to the first page;
receive movement data indicating that the touch has moved in a vertical direction relative to the user interface;
alter the visual representation in response to the movement data, as the touch reaches a vertical threshold relative to the user interface, such that the first page is visibly smaller on the user interface than the second page and such that transparency of the first page is increased relative to that of the second page;
receive release data indicating that the user has released the touch; and
alter the visual representation in response to the release data such that the first page and second page return to similar transparency and size in the original order of the first page and the second page in the electronic document.

7. The multifunction peripheral of claim 6 wherein the first page and the second page include superimposed visual indicia of the original order on the user interface.

8. The multifunction peripheral of claim 7 wherein the software will further cause the processor to alter the visual representation such that the superimposed visual indicia are updated when the touch passes over a horizontal threshold to reflect an altered order.

9. The multifunction peripheral of claim 6 wherein the software will further cause the processor, before it receives movement data indicating that the touch has moved in a vertical direction relative to the user interface, to:
receive movement data indicating that the touch has moved in a horizontal direction relative to the user interface, toward the second page; and
alter the visual representation of the second page in response to the movement data such that, as the touch passes over a horizontal threshold relative to the second page, the second page visibly moves in a direction opposite from the horizontal direction.

10. The multifunction peripheral of claim 6 wherein the software will further cause the processor to alter the visual representation in response to the touchdown data and hold data such that a z-ordering of the first page is increased relative to the second page such that the first page appears in front of the second page when the first page and second page overlap on the user interface.

11. Apparatus comprising a storage medium storing a program having instructions which when executed by a processor will cause the processor to:
display a visual representation of an electronic document including a first page and a second page in an original order on a user interface generated on a touchscreen display;
receive touchdown data indicating that a touch has been received from a user on the touchscreen display over the first page and hold data indicating that the user has held the touch for a predetermined period of time over the first page;
alter the visual representation in response to the touchdown data and the hold data such that the first page is visibly larger on the user interface than the second page and such that transparency of the second page is increased relative to the first page;
receive movement data indicating that the touch has moved in a vertical direction relative to the user interface;
alter the visual representation in response to the movement data, as the touch reaches a vertical threshold relative to the user interface, such that the first page is visibly smaller on the user interface than the second page and such that transparency of the first page is increased relative to that of the second page;
receive release data indicating that the user has released the touch; and
alter the visual representation in response to the release data such that the first page and second page return to similar transparency and size in the original order of the first page and the second page in the electronic document.

12. The apparatus of claim 11 wherein the first page and the second page include superimposed visual indicia of the original order on the user interface.

13. The apparatus of claim 12 wherein the software will further cause the processor to alter the visual representation such that the superimposed visual indicia are updated when the touch passes over a horizontal threshold to reflect an altered order.

14. The apparatus of claim 11 wherein the software will further cause the processor, before it receives movement data indicating that the touch has moved in a vertical direction relative to the user interface, to:
receive movement data indicating that the touch has moved in a horizontal direction relative to the user interface, toward the second page; and
alter the visual representation of the second page in response to the movement data such that, as the touch passes over a horizontal threshold relative to the second page, the second page visibly moves in a direction opposite from the horizontal direction.

15. The apparatus of claim 11 wherein the software will further cause the processor to alter the visual representation in response to the touchdown data and hold data such that a z-ordering of the first page is increased relative to the second page such that the first page appears in front of the second page when the first page and second page overlap on the user interface.

* * * * *